United States Patent
Yoshiie et al.

(10) Patent No.: US 6,851,497 B1
(45) Date of Patent: Feb. 8, 2005

(54) POWER-ASSISTED BICYCLE

(75) Inventors: Akihito Yoshiie, Shiga (JP); Kyosuke Kokatsu, Shiga (JP)

(73) Assignees: Sunstar Giken Kabushiki Kaisha, Osaka (JP); Sunstar Suisse SA, Ecublens (CH)

( * ) Notice: Subject to any disclaimer, the term of this patent is extended or adjusted under 35 U.S.C. 154(b) by 80 days.

(21) Appl. No.: 09/980,577
(22) PCT Filed: Jun. 5, 2000
(86) PCT No.: PCT/JP00/03633
§ 371 (c)(1),
(2), (4) Date: Mar. 14, 2002
(87) PCT Pub. No.: WO00/75006
PCT Pub. Date: Dec. 14, 2000

(30) Foreign Application Priority Data

Jun. 4, 1999 (JP) .......................................... 11-158088

(51) Int. Cl.[7] .......................................... B62M 23/02
(52) U.S. Cl. ...................................... 180/206; 192/45.1
(58) Field of Search ................................ 180/205, 206, 180/207; 192/46, 45.1, 56.57, 56.56, 56.55; 477/167, 181

(56) References Cited

U.S. PATENT DOCUMENTS

| 4,871,042 A | | 10/1989 | Hsu et al. |
| 4,966,380 A | * | 10/1990 | Mercat ........................ 280/259 |
| 5,678,668 A | * | 10/1997 | Sink ............................. 192/46 |
| 5,829,565 A | * | 11/1998 | Fergle et al. .................. 192/46 |
| 6,012,538 A | * | 1/2000 | Sonobe et al. ............... 180/220 |
| 6,193,038 B1 | * | 2/2001 | Scott et al. ................... 192/46 |
| 6,196,347 B1 | * | 3/2001 | Chao et al. .................. 180/206 |
| 6,263,992 B1 | * | 7/2001 | Li ............................... 180/206 |
| 6,487,936 B1 | * | 12/2002 | Wu et al. .................. 74/665 B |

FOREIGN PATENT DOCUMENTS

| GB | 2249529 | 5/1992 |
| JP | 7-309284 | 11/1995 |
| JP | 10-119872 | 5/1998 |
| JP | 10-226387 | 8/1998 |
| JP | 10-250672 | 9/1998 |
| JP | 10-318860 | 12/1998 |

* cited by examiner

Primary Examiner—Anne Marie Boehler
(74) Attorney, Agent, or Firm—Wenderoth, Lind & Ponack L.L.P.

(57) ABSTRACT

A power-assisted bicycle includes a torque detection mechanism system that is simple in structure, saves space, and is lightweight. A one-way clutch (72) for transmitting only rotation of the drive shaft (4) to the sprocket (70) in the direction in which the bicycle proceeds is disposed inside a hollow cylindrical portion (82) of the sprocket (70). On the sprocket face opposite thereto, a bearing (74) is engaged with an outer periphery of the cylindrical portion (82), and an elastic disc spring (76) holds the sprocket (70) with the aid of the bearing. The disc spring (76) is fixed to the bicycle body and a strain gauge (80) for detecting a stress deformation of the disc spring (76) is mounted on the surface thereof. As the drive shaft (4) is rotated by the aid of the pedaling torque, the one-way clutch (72) exerts an axially pressing force onto the sprocket (70) to deform the disc spring (76), and the strain gauge (80) detects the stress deformation of the disc spring (76) (that is, a physical parameter associated with the pedaling torque).

31 Claims, 12 Drawing Sheets

FLAT FACE RATCHET
<PIECE IN RAISED STATE>

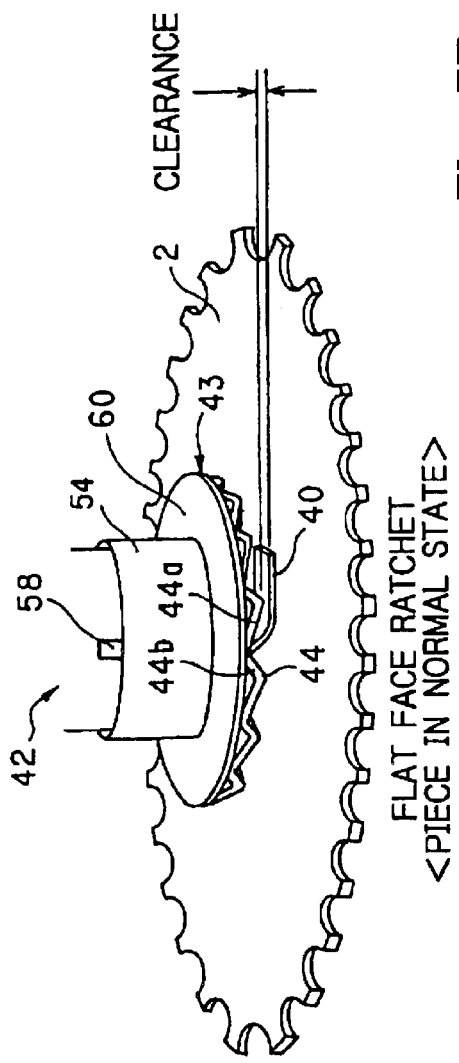
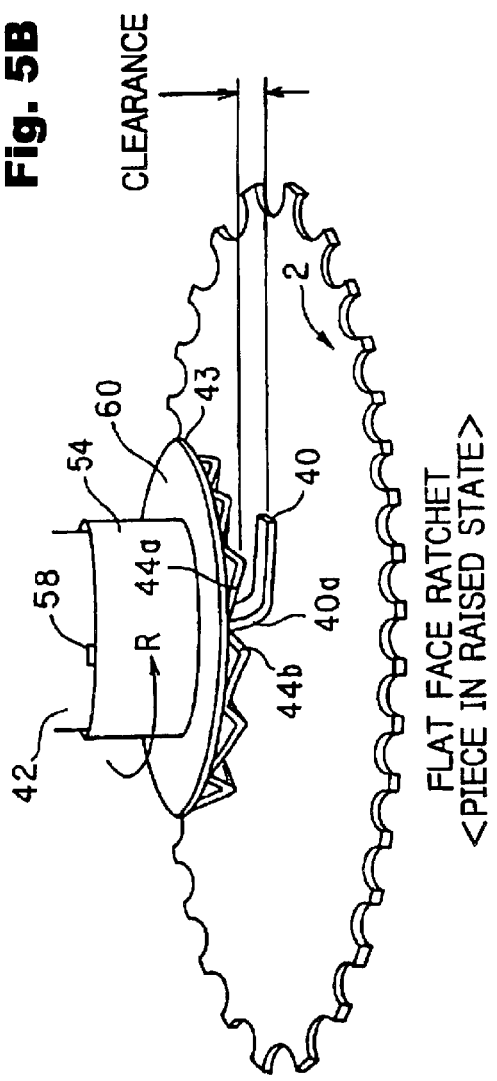

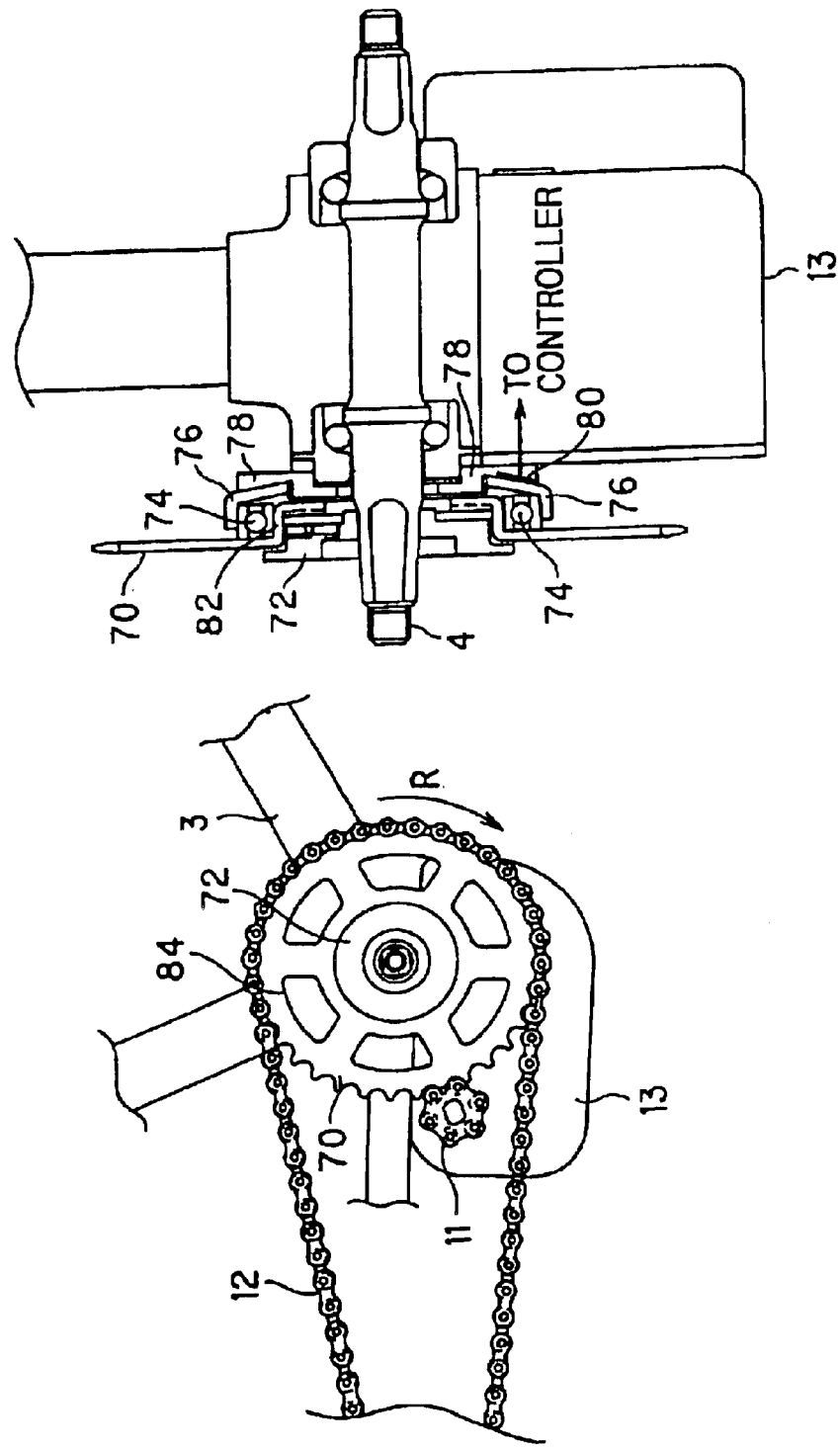

Fig. 12A
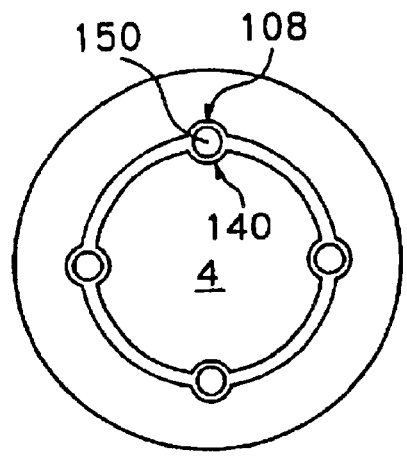
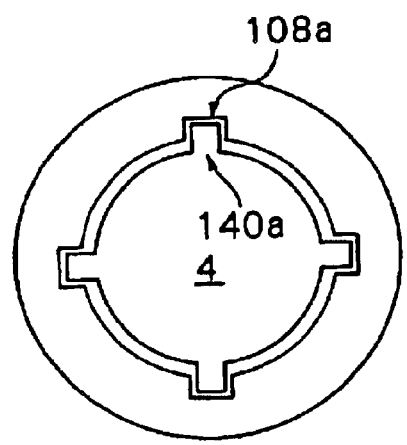
Fig. 12B
Fig. 12C
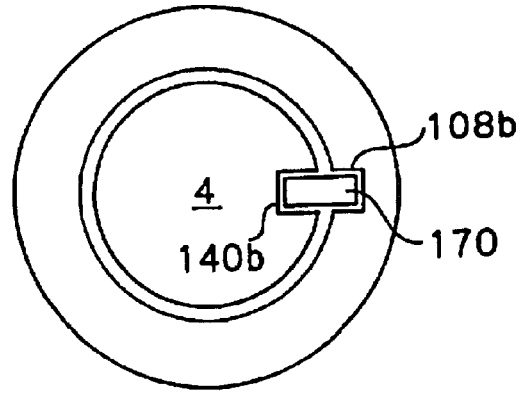

POWER-ASSISTED BICYCLE

TECHNICAL FIELD OF THE INVENTION

The present invention relates to a power-assisted bicycle arranged so as to add an assisting power to a pedaling force. More particularly, the present invention relates to a power-assisted bicycle with a torque detection system installed in a one-way clutch unit that transmits only a one-way rotation of a drive shaft to a sprocket.

BACKGROUND OF THE INVENTION

Heretofore, there has been proposed and applied a power-assisted bicycle arranged to assist a pedaling force by detecting a pedaling torque acting on a rotational mechanism in accordance with the pedaling force and applying an electric torque on the basis of a variation in the pedaling torque detected. Such a power-assisted bicycle is provided with a torque detection system for detecting the pedaling torque, which includes a torsion bar mounted in a crank shaft or on a rear wheel shaft, which causes a torsion deformation in accordance with the pedaling force. Further, this torque detection system may utilize a technology that involves detecting a variation in resistance of a potentiometer in association with a direct linear movement, as an input torque, into which a torsion deformation of a torsion bar is converted by means of a cam or any other suitable element connected to the torsion bar or that involves directly detecting an angle of torsion rotation of the torsion bar.

These technologies, however, present a problem in that, due to the installment of the torsion bar on the crank shaft or the like, a large space is required for installing the torque detection system and the weight of the torque detection system is increased, making it necessary to considerably modify the body frame of a conventional bicycle. Another problem is that the cam or any other suitable element has to be disposed in order to convert the torsion deformation of the torsion bar into a direct linear movement, or a system for directly detecting an angle of rotation by the torsion from each of the both ends of the torsion bar is required to be added. These matters may also create a problem in that the mechanism is rendered more complicated.

Therefore, in order to render the weight of the torque detection system lighter and the structure thereof simpler, there has been proposed a technology that can detect a crank-axial displacement, as a pedaling torque, by locating a conversion system for converting a rotational phase difference into an amount of the crank-axial displacement. The rotational phase difference is caused to arise between a driving part and a driven part, and the driving part is arranged so that the pedaled force acts directly thereon from the crank shaft side and the driven part being connected to the driven part and arranged so as to transmit the pedaled torque to a wheel rotation mechanism system.

For instance, Japanese Patent Laid-open Publication No. H8-230,756 discloses the technology of detecting a variation in distance of a disc member with respect to a frame as a physical amount corresponding to the pedaled torque, the variation in distance being caused by elongation of a coil spring in the crank-axial direction in accordance with the rotational phase difference between both ends of the coil spring by means of the pedaled torque. In this system, the disc member (e.g., a sprocket, etc.) for transmitting an input to the pedal received from the crank-shaft side to another mechanism system is supported on the frame so as to be rotatable and movable in the axial direction in a state in which the disc member is disposed coaxially with the crank shaft. Moreover, the coil spring is disposed in such a manner that one end portion thereof is fixed to the crank shaft while the other end portion thereof is fixed to the disc member in such a manner that the crank shaft is inserted inwardly.

Further, Japanese Patent Laid-open Publication No. H10-76,987 discloses a torque detection mechanism system composed of a drive disk connected directly to a drive shaft, and a follower disc plate connected directly to a sprocket. Two sheets of U-shaped spring plates are interposed between the drive disk and the follower disc plate, and a cam part is disposed at a connection of an outer periphery between the drive disk and the follower disc plate which are engaged slidably with each other so as to convert a rotational phase difference between the drive disk and the follower disc plate into an axial displacement. A slide cap is disposed so as to envelop the drive disk and slide in the axial direction together with the drive disk, a potentiometer is provided for detecting the displacement in the axial direction in a state in which a contact thereof is engaged with the slide cap, and a coil spring is provided for biasing the slide cap in the axial direction toward the driven disk side.

The torque detection mechanism system as disclosed in Japanese Patent Laid-open Publication No. H8-230,756 can achieve the purpose of simplifying the mechanism. However, it does not adequately solve the problem of saving space for the torque detection mechanism system due to the elongation of the crank shaft as a whole in the axial direction, because the coil spring is supported by the frame coaxially with the crank shaft, the coil spring being arranged so as to be elongated or contracted in the axial direction due to expansion or contraction of its diameter in accordance with the magnitude of the pedaling torque. Moreover, the addition of the heavy and large-sized coil spring presents a problem with the lightweight structure of the torque detection mechanism system because the coil spring is high in rigidity and in modulus of elasticity so as to withstand the pedaling force. Furthermore, this bicycle has a problem with a feeling of resistance when pedaling since it remains when pedaling.

Further, for the torque detection mechanism system as disclosed in Japanese Patent Laid-open Publication No. H10-76,987, the cam part is provided and a drive disk and a follower disc plate are added, which are arranged so as to slide in the axial direction in accordance with a rotational phase difference. This arrangement, however, cannot save a sufficient amount of space or be of a structure lightweight enough for the torque detection mechanism system, similar to the prior technology described immediately above.

SUMMARY OF THE INVENTION

With the above circumstances taken into account, the present invention has been completed and has the object to provide a power-assisted bicycle that can use a conventional body frame modified only slightly, as well as achieve a simple and lightweight structure of a torque detection mechanism system that is also economical in terms of space.

In order to achieve the object, the present invention provides a power-assisted bicycle of a type applying an assisting power in accordance with a pedaled force acting on a drive shaft, comprising a one-way clutch system coupling the drive shaft with a sprocket so as to transmit only a substantial one-way rotation of the drive shaft; a detection system for detecting a physical amount varying with a deformation of the one-way clutch system in accordance with the pedaling force; and a control system for controlling the assisting power on the basis of at least the physical amount detected by the detection system.

In accordance with the present invention, as the pedaling force is applied to rotate the drive shaft in a first direction (corresponding to the forward direction in which the bicycle is ridden), the pedaled torque is transmitted to the sprocket through the one-way clutch system. The pulling strength of a chain, for example, acts on the sprocket as a load, and a stress produced by competition or opposition between the load and the pedaling torque deforms the one-way clutch system and/or deforms it so as to displace the structuring elements along or in the direction of deformation. This deformation is determined in accordance with the pedaling force. In other words, as the pedaling force becomes larger, the extent of deformation becomes higher. Conversely, as the pedaling force becomes smaller, the extent of deformation becomes lower. The competitive stress that causes deformation maintains an equilibrium with a competitive force that competes with the stress. It is preferred that the elasticity reverting the deformation to its original shape acts on the one-way clutch system as the force competing with the competitive stress. For example, an elastic member may be disposed so as to impose elasticity against the deformation of the one-way clutch system. It is also possible to allow a structuring element of the one-way clutch system to share at least a portion of the elasticity.

The deformation of the one-way clutch system may include, for example, a variation in the relative position (including rotation) between the structuring elements as rigid members of the one-way clutch system as well as the elastic deformation of the whole or partial structuring elements of the one-way clutch system. In order to cause the deformation to occur in accordance with the pedaling force in the most efficient way, it is preferred that the one-way clutch system is deformed so as to expand or contract to the length corresponding to the pedaling force along the axial direction of the drive shaft.

The detection system detects the physical amount that is varied by the deformation of the one-way clutch system in accordance with the pedaling force. The physical amount may include, for example, a physical amount of the structuring elements of the one-way clutch system and a physical amount of another member in association with the one-way clutch system. For instance, specifically, the physical amount may include a deformation in position or stress of at least one part structuring the one-way clutch system relative to the body frame, a relationship of the relative positions between at least two parts structuring the one-way clutch system (including a clearance, angle between the parts, etc.), a variation in pressure against the direction of the deformation in the one-way clutch system, and a stress deformation of a member (e.g., an elastic member) disposed against the direction of the deformation in the one-way clutch system. The control system can assume a pedaling force on the basis of the detected physical amount because a variation in the physical amount can be determined in accordance with the pedaling force, thereby enabling the control system to control an assisting power.

In accordance with the present invention, the assisting power is controlled on the basis of the physical amount that varies with the deformation of the one-way clutch system requisite for the bicycle in accordance with the pedaling force. Therefore, the power-assisted bicycle according to the present invention can achieve the desired object without the addition of a separate part, such as a large-sized coil spring or a disk for use in detecting torque, which is not used in a conventional bicycle. Further, for the power-assisted bicycle according to the present invention, the elastic member may preferably be disposed such that it resists the deformation of the one-way clutch system. Still further, the elastic member is not required to be large because it does not undergo the competitive stress directly while it undergoes a force in the direction of deformation through the one-way clutch system. Moreover, the amount of deformation of the one-way clutch system can be rendered smaller so that an elastic member having a generally flat structure lower in height than in breadth can be disposed in such a manner that the direction of height of the elastic member is aligned with in the direction of deformation of the one-way clutch system. This can save a considerable amount of space. Such a generally flat elastic member may include, for example, a disc spring.

In a preferred embodiment of the present invention, the one-way clutch system may comprise a ratchet gear that deforms so as to expand or contract to the length in accordance with the pedaling force in the axial direction of the drive shaft. The ratchet gear in a preferred mode has a tooth part composed of a plurality of ratchet teeth formed on a first engagement face and a piece part composed of a plurality of ratchet pieces formed on a second engagement face, in which the first engagement face and the second engagement face are disposed in a generally vertical relationship with respect to the axial direction and in which the ratchet piece is engaged with the ratchet tooth so as to halt the relative rotation between the piece part and the tooth part: on the one hand, when the drive shaft rotates in one direction, and the ratchet piece is disengaged with the ratchet tooth so as to permit the relative rotation therebetween; on the other hand, when the drive shaft rotates in the inverse direction. Either one of the tooth part and the piece part is mounted on the drive shaft through a rotation-preventive system so as to enable sliding in the axial direction while preventing the relative rotation with respect to the drive shaft, while the other is connected to the sprocket.

In a further preferred embodiment of the present invention, either one of the tooth part and the piece part mounted slidably in the axial direction through the rotation-preventive system is supported so as to permit abutment of the elastic member with the rear face opposite to the engagement face thereof. The detection system may preferably be a deformation detection sensor that can detect a stress deformation of the elastic member. It is more preferable to use a disc spring as the elastic member to save space and a plurality of strain gauges disposed on the surface of the disc spring as the deformation detection sensor.

In this embodiment, the effects of the present invention can further be improved because the one-way clutch system as an essential structuring part is used as the torque detection mechanism system, and the disc spring integrating a backing load unit with a load detection sensor is used for the elastic member and a portion for detecting the pedaling torque. Therefore, the power-assisted bicycle according to the present invention can be implemented with few modifications to the frame structure of a conventional bicycle and can be lightweight, simple in structure as well as quiet while in use.

Other embodiments and effects of the present invention will become apparent in the course of the following description with reference to the accompanying drawings.

BRIEF DESCRIPTION OF THE DRAWINGS

FIGS. 5A and 5B are diagrammatice perspective illustrations showing an engaged state of the sprocket with the ratchet gear in order to describe an axial displacement of the ratchet tooth part.

FIGS. 8A and 8B are views showing a second embodiment of the present invention, in which FIG. 8A is a front view showing a sprocket of the second embodiment and FIG. 8B is a sectional side view showing a torque detection mechanism system according to the second embodiment.

FIG. 12 is a view showing an example of a rotation-preventive system for preventing the relative rotation of the piece part with respect to the drive shaft, in which FIG. 12A is a plan view showing a brief structure of a ball spline; FIG. 12B is a plan view showing a brief structure of a spline key; and FIG. 12C is a plan view showing a brief structure of a key groove.

DESCRIPTION OF THE PREFERRED EMBODIMENTS

Figure 1:
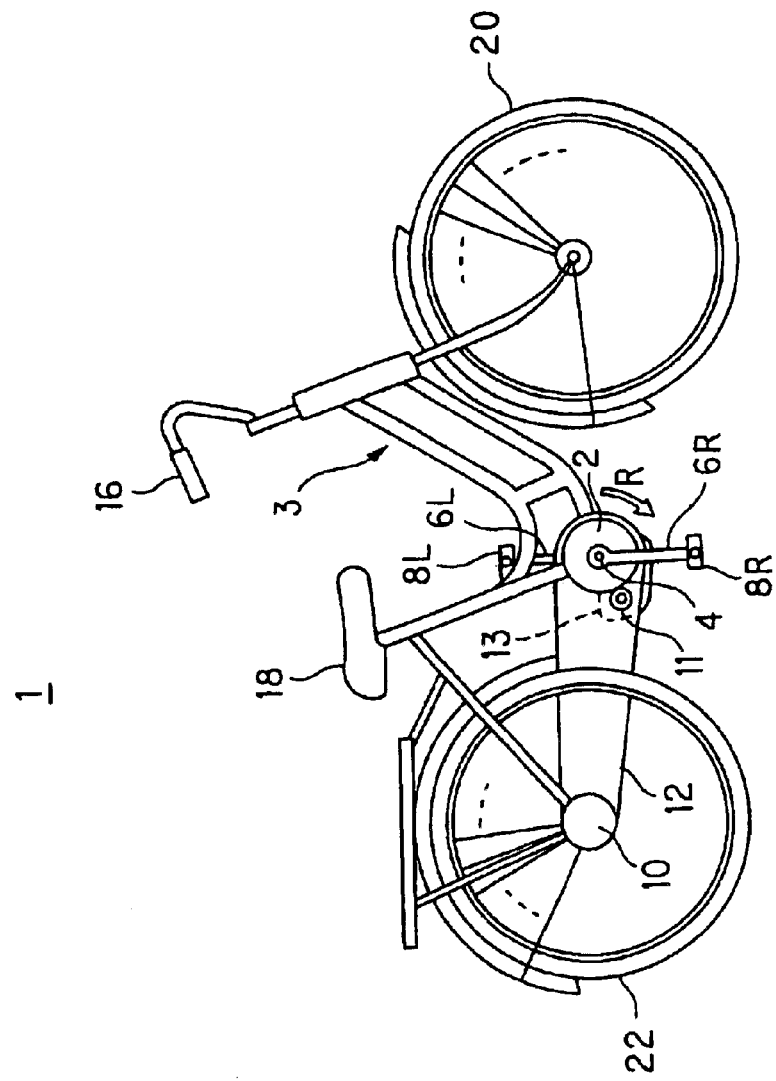
FIG. 1 is a brief illustration of a power-assisted bicycle according to the present invention.

A description will be given regarding the power-assisted bicycle according to each embodiment of the present invention with reference to the accompanying drawings. The power-assisted bicycle as will be described hereinafter is explained as an example of a power-assisted bicycle that can provide an assisting torque by means of an electric motor.
First Embodiment:

FIG. 1 is a brief representation of a power-assisted bicycle 1 according to the first embodiment of the present invention. As shown in FIG. 1, a major skeleton structure of the power-assisted bicycle 1 comprises a body frame 3 made of a metallic tube, and various elements including a front wheel 20, a handlebar 16 for steering the front wheel, a rear wheel 22, a saddle 18 and so on which are mounted on the body frame 3 in a conventional manner as with an ordinary bicycle.

At a central lower portion of the body frame 3, a drive shaft 4 is held on the body frame 3 so as to be rotatable, and pedals 8L and 8R are mounted at the left-hand and right-hand end portions of the drive shaft 4 through crank shafts 6L and 6R, respectively. A sprocket 2 (acting as the driven side) is coaxially mounted on the drive shaft 4 (acting as the driving side) through a ratchet gear, as will be described in more detail, and the ratchet gear is arranged to transmit only the rotational torque in a one-way direction (in the direction R) of moving the bicycle 1 forward from the driving side to the driven side.

Moreover, at the central portion of the rear wheel 22, a rear-wheel power mechanism system 10 is disposed to provide the rear wheel 22 with the pedaled force transmitted, and an endless chain 12 is wound between the sprocket 2 and a free wheel (not shown) disposed inside the rear-wheel power mechanism system.

The pedaled force in the advancing direction provided by the pedal 8 rotates the drive shaft 4 through a crank bar 6, and the rotating force acts on the sprocket 2 as the pedaled torque in the direction R as indicated in the drawing and rotates the sprocket 2 transmitting the pedaling torque to the rear-wheel power mechanism system 10 through the chain 12. As a consequence, the rear wheel 22 rotates and runs the bicycle 1 forward.

Now, a description will be given regarding the configuration of the torque detection mechanism system according to this embodiment of the present invention with reference to FIGS. 2 to 5.

Figure 3B:
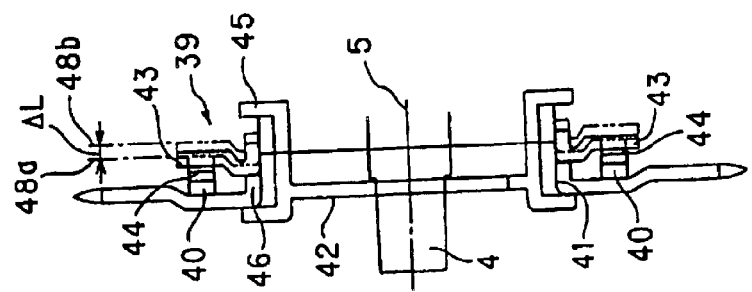
FIGS. 3A and 3B are a front view and a side view, respectively, showing a state in which a sprocket and a ratchet gear, each for use with the power-assisted bicycle according to the first embodiment of the present invention, are engaged with each other.
Figure 3A:
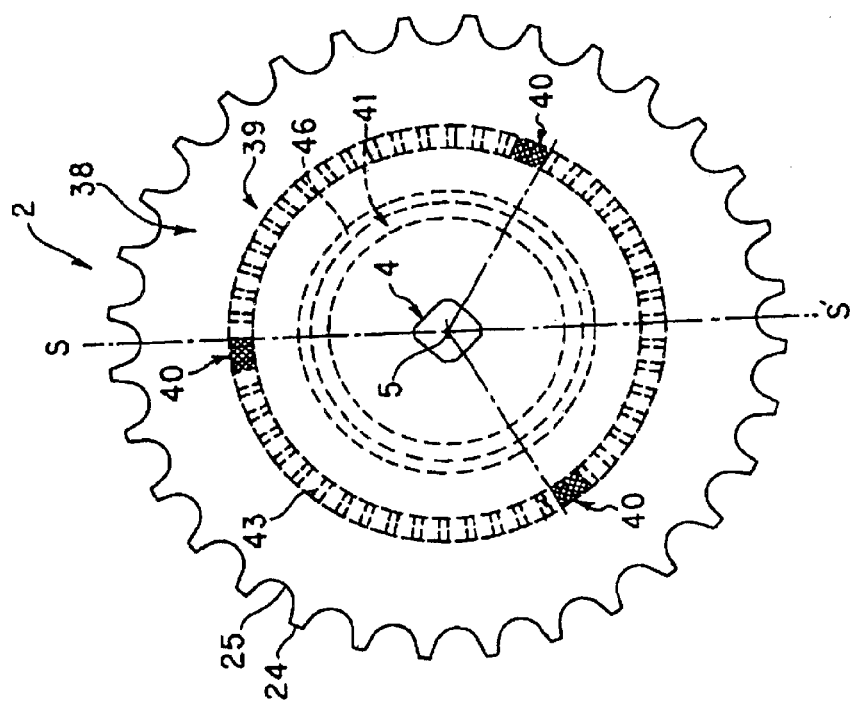

Referring first to FIG. 3, FIG. 3(A) shows a front view of the sprocket 2, and FIG. 3(B) shows a ratchet gear 39 connected to the sprocket 2 and a side view in section of the sprocket 2 and the ratchet gear 39, when taken along line S—S' of the front view. As shown in FIG. 3(A), the sprocket 2 comprises a rigid body portion 38 with a plurality of teeth 24 and depressions 25 between the adjacent teeth 24 so that, a chain 12 can be wound on the outer periphery of the rigid body portion 38. The rigid body portion 38 is provided at its central portion with a bore 41 through and into which the drive shaft 4 is inserted, and a cylindrical stopper 46 is provided surrounding the circumference of the bore 41.

The ratchet gear 39 includes three ratchet pieces 40 and a ratchet tooth portion 43. The three ratchet pieces 40 are each disposed in a fixed manner on the body portion 38 of the sprocket 2 at an equal angle in a spaced relationship apart at an equal distance from the center of the sprocket (in conformance with the drive shaft line 5 in the drawing). The ratchet tooth portion 43 is disposed on the first face side of the sprocket 2 so as to be engageable with the ratchet pieces 40.

The sectional side view of FIG. 3 illustrates a state in which the sprocket 2 and the ratchet gear 39 are mounted on the drive shaft 4. As is shown in this figure, a drive center shaft 42 is concentrically disposed around the drive shaft 4 in a fixed manner so that it does not move about the shaft. The drive center shaft 42 is provided at the outer periphery thereof with a seat 45 having a cylindrical shaft face generally parallel to the drive shaft line 5. The seat 45 has the sprocket 2 and the ratchet tooth portion 43 disposed in an engaged state. The sprocket 2 is arranged in such a manner that it can rotate separately and independently from the drive center shaft 42 within the seat 45 in the direction in which no clutch of the ratchet gear acts, while the ratchet tooth portion 43 is fixed to the drive center shaft 42 in a manner as will be described hereinafter.

Now, a description will be given regarding the state of engagement of the sprocket 2 with the ratchet tooth portion 43 and the clutch function with reference to FIGS. 4 and 5.

Figure 4:
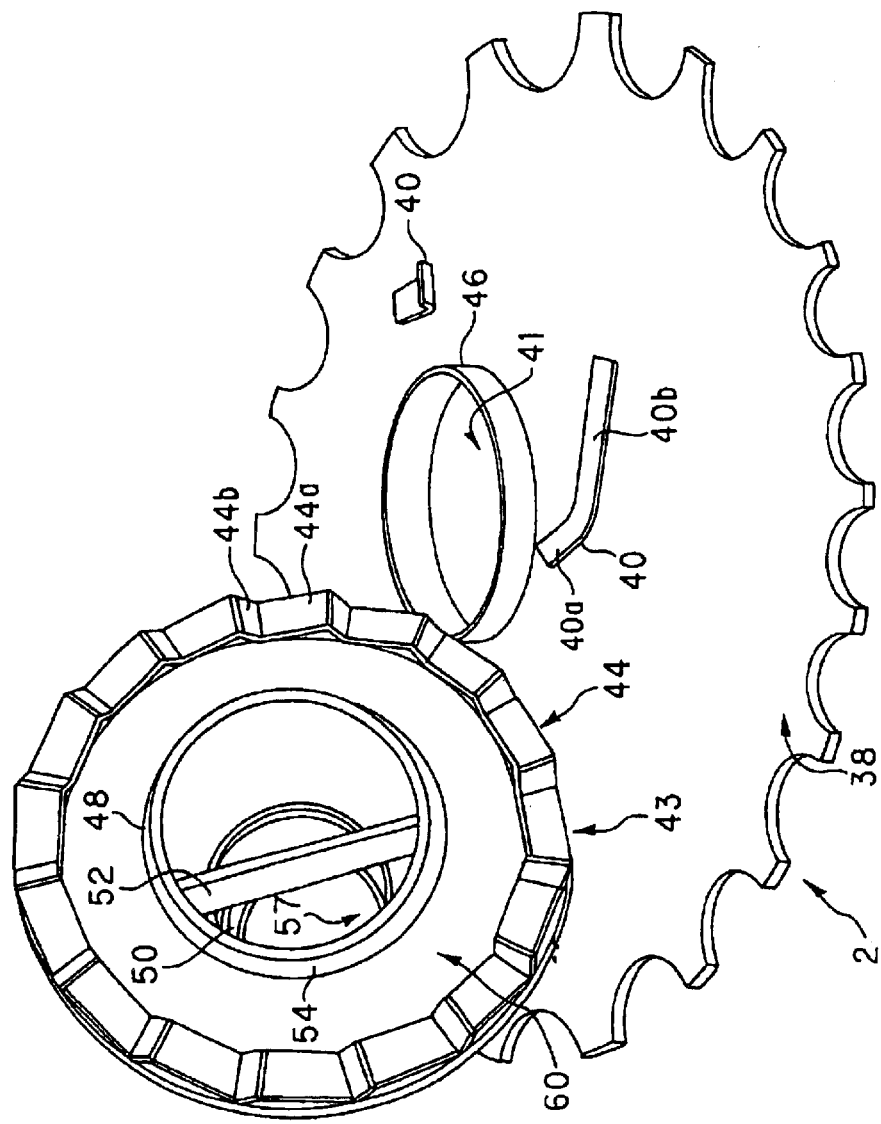
FIG. 4 is a diagrammatic perspective illustration showing an exploded state of the sprocket and a ratchet tooth part.

FIG. 4 is a diagrammatically perspective representation of an exploded state of the sprocket 2 and the ratchet tooth portion 43. As shown in FIG. 4, the ratchet pieces 40 are each formed as a backstop-shaped member with a slenderly elongated, flat and elastic bent plate made of a metal, and a rear portion 40b of the ratchet piece 40 is fixed to the body portion 38 of the sprocket 2 by welding or any other appropriate means in such a manner that an end portion 40a of the backstop-shaped member is inclined at a predetermined angle with respect to the body portion 38 thereof.

The ratchet tooth portion 43 has a disk part 60 with a flat surface. On the flat surface of the disk part 60 on the side facing the sprocket face, there are formed a plurality of teeth 44 over the entire outer periphery thereof, which can be engaged with the ratchet pieces 40. Each of the teeth 44 has a gradually sloping face 44a and a sharply sloping face 44b. Moreover, the disk part 60 is provided at its central portion with a cylindrical center shaft 54 extending axially and protruding outwardly toward both sides thereof from the flat surface of the disk part 60. The center shaft 54 is provided with a through aperture 57 that can receive the drive center shaft 42 disposed about the drive shaft 4. Inside the center shaft 54 at the opposite side facing the sprocket face of the disk part 60, a baffle portion 52 in the form of a flat plate is coupled with and fixed to the inner shaft wall so as to bridge the through aperture 57 in the diametrical direction. Further, a coil spring 50 is inserted in the center shaft 54 so that one end portion of the coil spring 50 comes into abutment with the baffle portion 52, and the other end portion thereof is fixed to a drive shaft, although not shown.

In the state of engagement of the sprocket 2 with the ratchet tooth portion 43, the end portion 40a of the ratchet piece 40 can enter the depression defined by the adjacent sloping faces 44a and 44b and the topmost end part thereof comes into abutment with the depression in a state opposite to the sharply sloping face 44b, as shown in FIG. 5. The aperture 57 of the center shaft 54 receives the drive center shaft 42. In this case, although not shown in the drawings, the baffle portion 52 is inserted in a further elongated slot 58 formed so as to penetrate through the shaft portion along the axial direction of the drive center shaft 42. This structure allows the ratchet tooth portion 43 to rotate together with the drive shaft 4 which is rotatable by the pedaled torque, although it does not rotate with respect to the drive center shaft 42. As the axial width of the baffle portion 52 is set to be shorter than the length of the slot 58, the baffle portion 52 can slide in the axial direction along the slot 58. At this time, the baffle portion 52 is engaged at the height at which the topmost end portion of the ratchet piece 40 is engaged with the ratchet tooth portion 43 because it is biased by the coil spring 50 in the direction toward the sprocket 2.

As shown in FIG. 5B, as the drive center shaft 42 rotates in the direction R corresponding to the direction of the bicycle 1 moving forward, the ratchet tooth portion 43 and the sprocket 2 are allowed to rotate together in the direction R, together with the drive center shaft 42, because the topmost end portion of the ratchet piece 40 does not slide along the sloping face due to the abutment with the sharply sloping face 44b of the tooth 44. On the other hand, as the drive center shaft 42 rotates in the direction opposite to the direction R, the topmost end portion of the ratchet piece 40 is not engaged with the sloping face and slides along it because the rear face of the end portion 40a of the ratchet piece 40 comes in abutment with the gradually sloping face 44a thereof, whereby no rotation of the drive center shaft 42 is transmitted to the sprocket 2. This is the principle of the one-way clutch mechanism of the ratchet gear 39.

When the rotation of the drive center shaft 42 as in the direction R is transmitted to the sprocket 2 through the ratchet tooth portion 43, the elastic ratchet piece 40 rises due to resistance to the rotational force applied by the sharply sloping face 44b, as shown in the lower part of FIG. 5. Therefore, the ratchet tooth portion 43 is displaced in the axial direction from the ordinary axial position (the position 48a of FIGS. 2 and 3) apart from the sprocket 2 due to resistance to the biasing force of the coil spring 50 and stops at the position (the position 48b of FIGS. 2 and 3) at which the rotational force by the pedaled force is balanced with the elasticity of the ratchet piece 40. As the pedaled torque is decreased, the rotational force applied by the sharply sloping face 44b becomes smaller, so that the ratchet piece 40 is forced to revert to its original position due to its elasticity. At the same time, the ratchet tooth portion 43 biased downwardly by the coil spring 50 is displaced in the axial direction while approaching the sprocket 2. Therefore, an amount ΔL of axial displacement (FIG. 3) of the ratchet tooth portion 43 reflects a magnitude of the pedaled torque.

Figure 2:
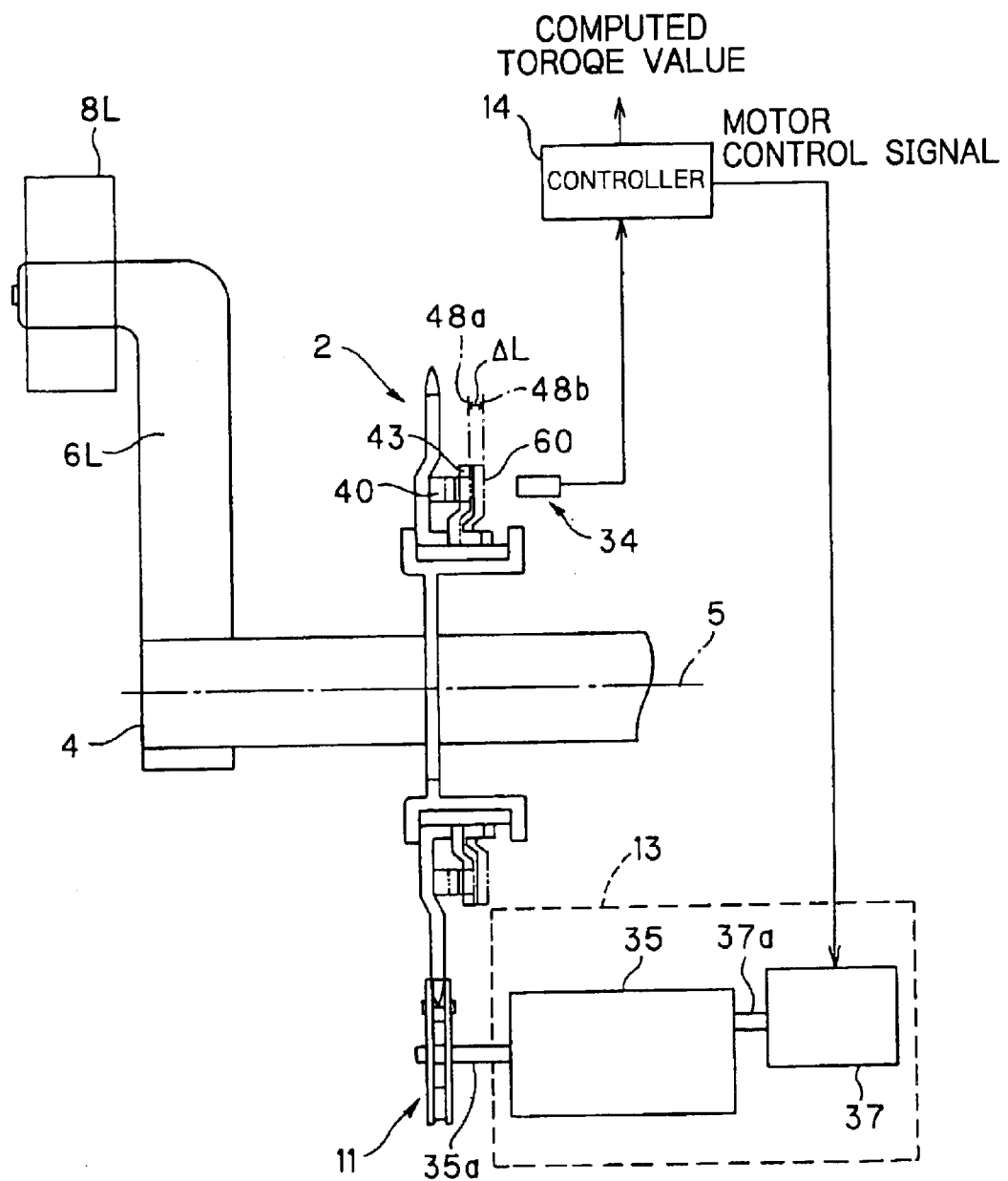
FIG. 2 is an illustration of a torque detection mechanism system of a power-assisted bicycle according to a first embodiment of the present invention.

In order to detect the amount of axial displacement of the ratchet tooth portion 43, a position sensor 34 may be mounted on the frame of the bicycle body so as to detect an axial distance from a predetermined position to the disk part 60 of the ratchet tooth portion 43, as shown in FIG. 2. The position sensor 34 may be implemented, for instance, by a detecting member made of a magnetic material such as ferrite or the like, mounted so as to move axially in accordance with the axial displacement of the disk part 60, a coil disposed in the vicinity of the detecting member, and a detection circuit capable of electrically detecting a variation in inductance of the coil as a variation in impedance. In this arrangement, although the detecting member comes closer to the coil or moves apart therefrom in accordance with the amount of the axial displacement of the ratchet tooth portion 43, the inductance of the coil can vary with the distance between the detecting member and the coil to enable the axial distance L1 up to the ratchet tooth portion 43 to be computed by the detection of this variation in the inductance by the detection circuit. It is to be understood herein as a matter of course that, as long as the axial distance or the amount ΔL of the axial displacement of the ratchet tooth portion 43 can be detected, a sensor of some chosen type other than the type as described above can also be used, and some sensors may also be disposed inside the ratchet gear 39.

The output end of the position sensor 34 is connected to a controller 14 that receives a detection signal from the sensor. The controller 14 may be implemented by a microcomputer or the like and have operational functions for computing a value of the pedaled torque on the basis of the received detection signal relating to the axial distance.

Now, a power-assisting system according to this embodiment of the present invention will be described hereinafter. As shown in FIG. 2, the power-assisting system may comprise a sprocket drive gear 11 engageable directly with the sprocket 2, an electric motor 37 rotatably driven by a battery, although not shown, and transmitting the assisting torque by the aid of a rotary shaft 37a, a reduction gear mechanism 35 for reducing the rotational speed of the electric motor 37 around the rotary shaft 37a and transmitting the rotary movement to the sprocket drive gear 11 via a gear shaft 35a, and the controller 14 for controlling the electric motor 37 on the basis of the computed value of the pedaled torque.

The reduction gear mechanism 35 may comprise, for example, a combination of plural gears and so on. In the middle portion of the transmission passage of the assisting torque, which is composed of the gears and so on, there may be disposed a so-called one-way clutch (although not shown) for transmitting power in only one direction. The one-way clutch is arranged in such a manner that it can transmit the assisting torque from the electric motor 37 to the sprocket drive gear 11, but it cannot transmit it in the reverse direction, that is, in the direction from the sprocket drive gear to the reduction gear mechanism 35. This arrangement can ensure a continuous, smooth and light operation of the bicycle without transmitting any load of the electric motor 37 to the sprocket 2 when it is not being ridden.

Figure 6:
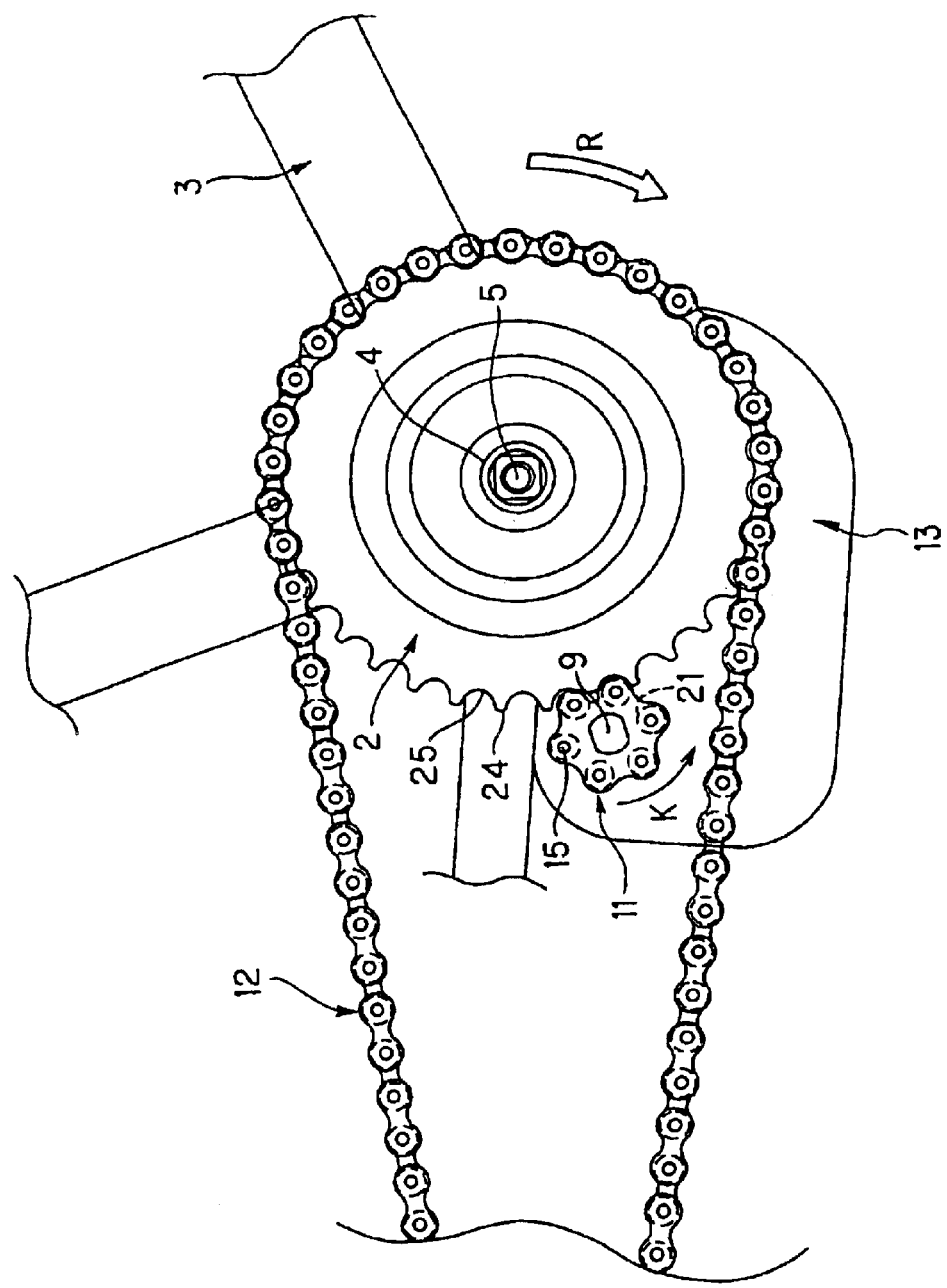
FIG. 6 is a front view showing a sprocket and a sprocket drive gear for the power-assisted bicycle according to the first embodiment of the present invention.

A front view of the state of engagement of the sprocket drive gear 11 with the sprocket 2 is shown in FIG. 6 (in which the crank bar is omitted). As shown in FIG. 6, the chain 12 wound on the sprocket 2 comprises an arrangement in which pin links are alternately combined with roller links. The pin links are disposed in such a manner that two pins are forced into two ring plates of a cocoon type, and the roller link is disposed in such a manner that two bushes are forced into two ring plates and a roller is inserted in the outer periphery of the bush so as to be rotatable. For each roller constituting the pin link and the roller link of the chain 12, the pitch and the diameter of the roller are defined so as to come into engagement with each tooth of the sprocket 2.

Figure 7A:
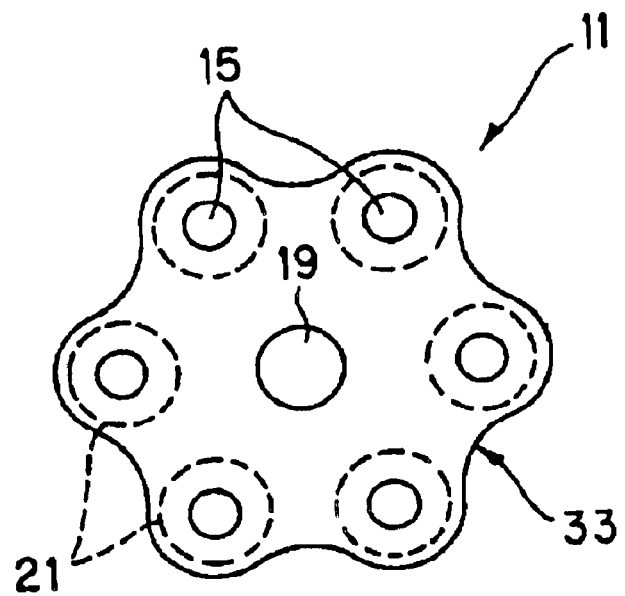
FIGS. 7A and 7B are a front view and a side view, respectively, showing the sprocket drive gear.
Figure 7B:
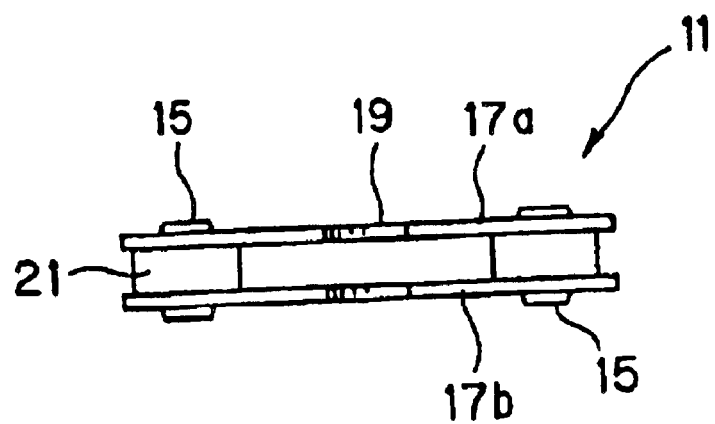

The sprocket drive gear 11 may be engaged with the sprocket 2, for example, as shown in FIGS. 6 and 7, in substantially the same manner as the chain 12 is. The sprocket drive gear 11 may comprise two roller plates 17a and 17b disposed in a parallel arrangement, a plurality of cylindrical bushes (a roller shaft) 15 each being generally vertically forced into the plates at a pitch equal to that of the roller of the chain 12 along the peripheral region of the plates so as to connect the plates to each other, and a plurality (six in this example, as shown in the drawing) of cylindrical rollers 21 each being inserted rotatably so as to cover the outer periphery of each of the bushes. Each of the roller plates 17a and 17b is provided at its central portion with a mounting aperture 19 through and on which a drive unit 13 is mounted. At an outer peripheral portion of the sprocket drive gear 11 between the adjacent rollers 21 is formed a depression 33 depressed inwardly.

The two adjacent rollers 21 of the sprocket drive gear 11 are engaged with the depressions 25 of the sprocket 2, and one tooth 24 of the sprocket 2 is allowed to enter into a clearance between the rollers, as shown in FIG. 6. The depression 33 of the sprocket drive gear 11 is preferably formed so that the tooth of the chain 12 is readily engageable into the rollers 21. For example, it is preferred that the depression 33 is shaped in substantially the same form as a narrow central part of the link plate of the chain 12 in a cocoon form.

Now, a description will be given regarding the action of the first embodiment of the present invention with reference to the accompanying drawings.

As the rider presses the pedals 8R and 8L down to rotate the drive shaft 4 in the direction R, the ratchet tooth portion 43 fixed non-rotatably on the drive shaft 4 by the aid of the baffle portion 52 rotates together with the drive shaft 4 and applies the pedaled torque to the sprocket 2 through the ratchet pieces 40 engaged with the teeth 44 of the ratchet tooth portion 43, the sprocket 2 on which the tensile force from the chain 12 acts as a load. At this time, the elastic ratchet pieces 40 are caused to arise in resistance to the rotational force applied from the sharply sloping faces 44b of the ratchet teeth, and the ratchet tooth portion 43 is displaced in the axial direction so as to separate from the sprocket 2 from the ordinary axial position (the position 48a of FIG. 3), while resisting the biasing force of the coil spring 50, and halt at the position (the position 48b of FIG. 3) at which the rotational force due to the pedaled force and the elasticity of the ratchet pieces 40 are well balanced.

Turning now to FIG. 2, the position sensor 34 always senses the axial distance from its fixed position to the disk portion 60 of the ratchet tooth portion 43 and transmits the detection signal (corresponding to the position 48b) to the controller 14. Then, the controller 14 determines the amount AL of the axial displacement based on a difference between the position 48a of the ratchet tooth portion 43 at the time the pedaled torque saved in advance with an internal memory does not act thereon and the position 48b of the ratchet tooth portion 43 represented by the received detection signal. As the amount AL of the axial displacement becomes larger as the pedaled torque becomes larger, the controller 14 can compute the value of the pedaled torque from the relationship of the above two elements. This can be implemented, for example, by experimentally determining the relationship of the amount ΔL of the axial displacement with the pedaled torque and saving a reference table representative of this relationship in the internal memory of the controller 14.

Then, the controller 14 determines the assisting torque Te to be applied at least on the basis of the pedaled torque T computed. Next, the controller 14 computes the control signal giving an instruction to the electric motor 37 to electrically drive and rotate the motor by means of the assisting torque. Thereafter, the controller 14 outputs the control signal. It is also possible to mount a bicycle speed sensor on the bicycle and compute the assisting torque T on the basis of the pedaled torque T and the bicycle speed.

For instance, in the case of the simplest power-assisted control, as the computed pedaled torque T reaches a predetermined value or higher, the motor control signal is generated giving an instruction to turn the electric motor 37 on and produce the assisting torque so as to maintain a predetermined ratio with respect to the pedaled torque. In other cases, the controller 14 generates a motor control signal giving an instruction to turn the electric motor 37 off. In this case, the electric motor 37 may be turned on by directly utilizing the amount ΔL of the axial displacement only when this value reaches the predetermined value or higher.

As the electric motor 37 is turned on and rotates, the rotational force is transmitted to the sprocket drive gear 11 through the reduction gear mechanism 35, and the sprocket drive gear 11 rotates about the central drive shaft 9 thereof in the direction K as shown in FIG. 6. At this time, each of the rollers 21 is allowed to engage with the depressions 25 of the sprocket 2 one after another, while the sprocket 2 provides the drive torque in the direction R about the central shaft line 5 of the drive shaft 4. As described above, in this embodiment, the assisting torque from the electric motor 37 is transmitted through the sprocket drive gear 11 to the region of the sprocket 2 where highly rigid teeth 24 are formed, so that it can assist the pedaled force without bending the sprocket 2 and deviating from the center of rotation. This allows the assisting torque to be added under the conditions in which the pedaled torque is considered to reach a predetermined value or higher, whereby the operation of pedaling the bicycle can be carried out with ease.

In the embodiment as described above, the torque can be computed on the basis of the amount of axial displacement in the ratchet gear that need also be provided for a conventional bicycle, without adding separate members and systems, including elastic members or transmitting mechanism system, each having high rigidity, volume and weight, to such a conventional bicycle. Accordingly, a space for the torque detection mechanism system and a weight thereof can be significantly reduced. This can also assist in simplifying the torque detection mechanism system.

Further, in this embodiment of the present invention, the assisting torque from the electric motor 37 is transmitted through the sprocket drive gear 11 to the outer periphery portion of the sprocket 2 having a large diameter, enabling this arrangement to offer the advantage that a larger reduction ratio can be given compared with the arrangement in which the assisting torque is added from the drive shaft 4.

This can render the torque detection mechanism system smaller and lighter, as well as simplify the mechanism system.

Moreover, in this embodiment of the present invention, the power-assisted system is configured simply by including the elastically deformed portion of the torque detection mechanism system integrally in the ratchet gear and by locating the sprocket drive gear 11 and the drive unit 13, so that no large modifications or changes of a frame structure of a conventional bicycle are required. Therefore, the power-assisted bicycle in this embodiment can also be made smaller and lighter, and manufacturing costs can be reduced.

Second Embodiment:

FIGS. 8(A) and 8(B) each illustrate a torque detection mechanism system in accordance with a second embodiment of the present invention. In this embodiment, the elements other than the torque detection mechanism system are the same as those of the first embodiment, so that identical and like structuring elements are provided with identical reference numerals and symbols and a duplicate detailed description thereof will be omitted for brevity of explanation.

As shown in FIGS. 8(A) and 8(B), the torque detection mechanism system of the second embodiment is provided with a sprocket 70 having a cylindrical accommodation part 82 at the central portion thereof. The cylindrical accommodation part 82 is shaped in a cylindrical form that protrudes toward a first plate face side of the sprocket 70 and is depressed on the other (second) plate face side thereof. The sprocket 70 may be disposed so that the depression of the cylindrical accommodation part 82 is directed to the pedal side, and the depression thereof accommodates a one-way clutch 72 that can transmit only the rotation in the first direction from the driving side portion to the driven side portion. The one-way clutch 72 has its driven side portion fixed to and coupled with the drive shaft 4 at its engagement portion with the depression of the cylindrical accommodation part 82 so as to transmit only the rotation in the direction R to the sprocket 70. The sprocket 70 is provided with a plurality of holes 84 (see FIG. 8(*a*)) about the cylindrical accommodation part 82 in order to make the sprocket lightweight.

The one-way clutch 72 may be a clutch of the type that can displace the driven side portion of the one-way clutch 72 toward the sprocket side along the axial direction by an amount of displacement corresponding to the magnitude of the pedaled torque when the drive shaft 4 is rotated in the direction R and the rotational force is transmitted to the sprocket 70. As an example, there may be used a one-way clutch of a ratchet gear type as used in the first embodiment of the present invention.

On the further inner face of the sprocket 70 on the opposite side, bearings 74 are disposed about the protruding portion of the cylindrical accommodation part 82 to hold the cylindrical accommodation part 82 from the surrounding side. The bearings 74 may preferably be disposed so as to compete with the load from both of the axial direction and the radial direction. Moreover, an elastic and metallic disc spring 76 in the form of a truncated cone may preferably be disposed to hold the bearings 74 so as to envelope the outer surroundings of the bearings 74, and the disc spring 76 may be fixed to the bicycle body through a rigid support member 78. In other words, the sprocket 70 is held elastically against the bicycle body so as to be rotatable on the side opposite to the one-way clutch 72. As will be apparent from FIG. 8(B), there is a region in the axial position where an image of the axial width of the one-way clutch 72 overlaps with an image of the axial width of the disc spring 76 when the axial widths of the one-way clutch 72 and the disc spring 76 are projected against the central axial line of the drive shaft 4.

Moreover, the disc spring 76 is provided with a strain gauge 80 for detecting a deformation of the disc spring in accordance with the stress applied thereto, and the strain gauge 80 is connected to the controller 14 (see FIG. 2). The strain gauge 80 may be made, for example, from a resistance element made of a metallic thin layer. When such a thin-layer metallic resistance element is used for the strain gauge 80, an insulating layer of an oxide film may be disposed on the mirror-polished surface of the disc spring 76, and a resistance member composed of a plurality of elements is formed thereon in a bridge form by means of spattering or any other conventional techniques. The controller 14 can detect a variation in resistance of the bridge element due to the stress deformation applied to the disc spring 76, and then determines the magnitude of the stress thereof. In order to improve the accuracy of detection, the strain gauge 80 may preferably be installed at a location at which the disc spring 76 is most likely to undergo the stress deformation, so that the amount of stress deformation causes a variation in resistance values to become as large as possible.

As a substitute for the strain gauge 80, for example, a piezoelectric resistance element for detecting a variation in resistance by the pressure applied to the disc spring 76 or a position sensor for detecting an amount of displacement of the surface of the disc spring 76 may be used.

Now, the action of the second embodiment of the present invention will be described in more detail.

As the rider presses the pedals 8R and 8L down to rotate the drive shaft 4 in the direction R, the rotational force is transmitted to the sprocket 70 through the driving side portion of the one-way clutch 72. At this time, the driven side portion of the one-way clutch 72 has a tendency to be displaced toward the sprocket side along the axial direction by the amount of displacement corresponding to the pedaled torque, so that the force of pressing inside acts on the sprocket 70 along the axial direction. This inside-pressing force is applied to the disc spring 76 holding the sprocket 70 through the bearings 74 and causes stress deformation in the disc spring 76. This stress deformation reflects the amount of the axial displacement of the sprocket 70 by the one-way clutch 72, that is, the magnitude of the pedaled torque.

The resistance value of the strain gauge 80 varies with the stress deformation of the disc spring 76. The variation in the resistance values is detected with the controller 14 that in turn pre-saves, in its internal memory, the relationship of the resistance value of the strain gauge 80 with the pedaled torque in the form of a reference table and then determines the pedaled torque T by referencing the detected resistance value of the strain gauge 80 to the reference table. Then, in a manner similar to that in the first embodiment of the present invention as described above, the controller 14 controls the electric motor 37 so as to drive and rotate by means of the assisting torque Te computed on the basis of the pedaled torque T, and the assisting torque is transmitted directly to the sprocket 70 through the sprocket drive gear 11.

As described above, in the second embodiment of the present invention, too, the torque can be computed on the basis of the stress deformation of the disc spring 76 caused by the pressing force of the one-way clutch 72 that need also be provided for a conventional bicycle, without adding the highly rigid, voluminous and heavy separate elastic member and transmission mechanism system, etc., to a conventional power-assisted bicycle. Therefore, the second embodiment of the present invention can greatly reduce the space and weight of the torque detection mechanism system and simplify the mechanism thereof.

Further, the second embodiment can further shorten a stroke in the axial direction because the one-way clutch 72 and the disc spring 76 are disposed within the same width range in such a manner that the former is accommodated in the cylindrical accommodation part 82 of the sprocket 70, and the latter is located so as to cover the outer periphery of the cylindrical accommodation part 82 thereof. This advantage can be further improved by adopting a way of detecting an amount corresponding to the pedaled torque by the strain gauge 80 formed in a thin form on the surface of the disc spring 76, thus providing the second embodiment of the present invention with more pronounced effects than that of the first embodiment in terms of space saving.

Third Embodiment:

A torque detection mechanism system according to a third embodiment of the present invention will be described in more detail with reference to FIGS. 9 to 11. As the elements other than the torque detection mechanism system are identical to those of the first and second embodiments, elements of the third embodiment that are similar to those of the first and second embodiments are provided with the same reference numerals, and a detailed description of those same or like elements will be omitted from the following description.

Figure 9:
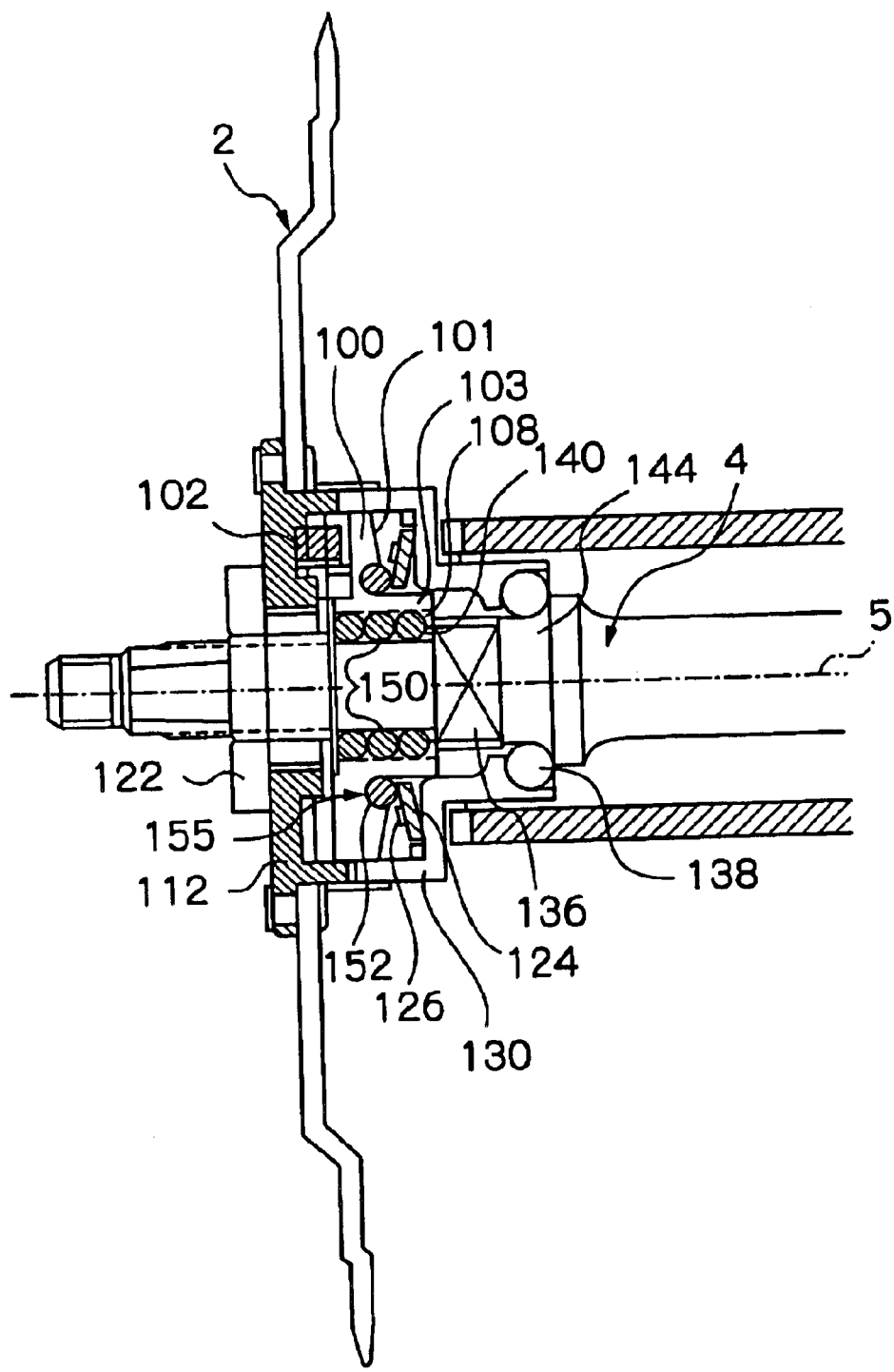
FIG. 9 is a sectional side view showing a torque detection mechanism system according to a third embodiment of the present invention.
Figure 10:
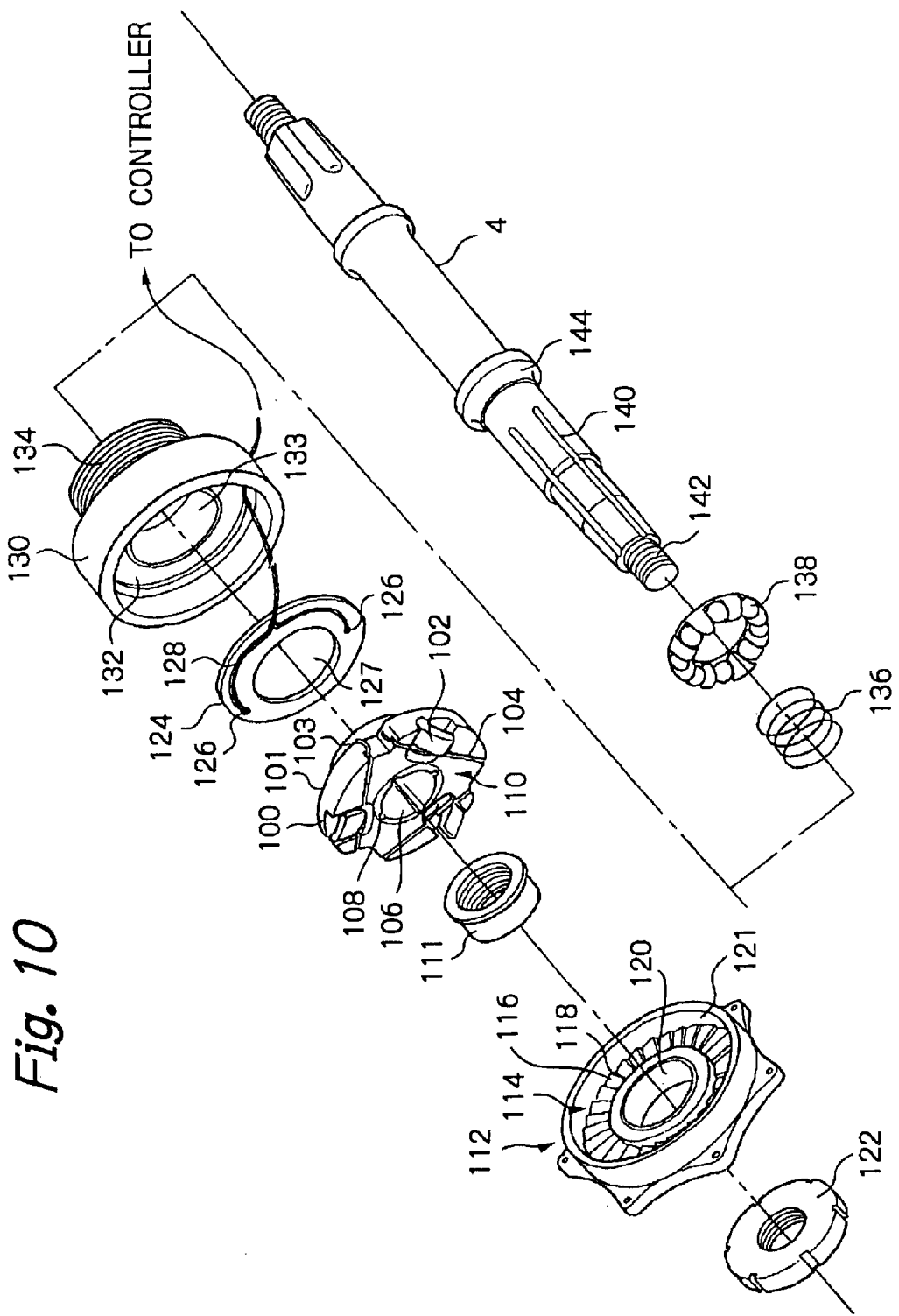
FIG. 10 is an exploded perspective view showing a ratchet gear structure of the torque detection mechanism system of FIG. 9.

As shown in FIG. 9, the sprocket 2 is supported by the drive shaft 4 through a ratchet gear that has a piece part 100 and a tooth part 112 as shown in FIG. 10.

The piece part 100 may include three ratchet pieces 102 disposed on a second engagement face 110 at an equal angle (i.e., spaced apart evenly) along the peripheral direction. Each of the ratchet pieces 102 may be made of a rigid material and disposed so as to pivot about the shaft in the vicinity of the second engagement face 110 and in the generally radial direction of the second engagement face. Each ratchet piece 102 is biased with a piece-raising spring 104 so that its lengthwise direction assumes a given angle with respect to the second engagement face 110 (a balance direction 160 of FIG. 11), when no force acts on the ratchet piece 102. As shown in FIG. 11, as each ratchet piece 102 deviates from the balance direction 160 in an ascending direction a or in a descending direction b, the piece-raising spring 104 imposes a slight magnitude of elasticity on the ratchet piece 102 so as to return the ratchet piece 102 to the balance direction 160.

At a central portion of the piece part 100, there is formed a bore 106 that receives the drive shaft 4, and a cylindrical portion 103 protruding from the rear face 101 of the piece part 100 is inserted into the bore 106. The rear face 101 of the piece part 100 is provided with a circular groove 155 (FIG. 9) on the outer periphery of the cylindrical portion 103, and a number of steel balls 152 are inserted in the circular groove 155. Therefore, the rear face 101 provides an axially loading bearing and an axially sliding bearing.

A disc spring 124 is brought into abutment with the rear face 101 of the piece part 100 by inserting the cylindrical portion 103 into a central bore 127 of disc spring 124. In this case, the disc spring 124 is in slidable abutment with the rear face 101 through the steel balls 152, that is, the loading bearing, in the direction elastically resisting the pressure from the piece part 100. On the front surface of the disc spring 124 may be disposed a strain gauge 126 at two opposite locations separated by 180 degrees. The strain gauge 126 is electrically connected to the controller 14 via a lead wire 128. More preferably, the strain gauges may be disposed on the disc spring 124 at three locations or more. At this time, it is preferred that a plurality of the strain gauges be disposed on the front surface of the disc spring 124 in positions rotation-symmetrical to each other (i.e., evenly spaced about disc spring 124).

The disc spring 124 is accommodated in an inner bottom portion 132 of a supporting member 130 in a bowl form. The supporting member 130 is provided with a through support bore 133 passing through its central portion for receiving the drive shaft 4 and with a supporting cylindrical portion 134 protruding from its rear face. The inner wall of the supporting cylindrical portion 134 engages a bearing 138 corresponding to the loads in both of the axial and radial directions (as shown in FIG. 9). The bearing 138 is engaged with a sloping stopper face 144 formed on the drive shaft 4.

The inner wall of the bore 106 of the piece portion is provided with first rotation-preventive grooves 108 at four locations, each extending in the axial direction 5. The outer wall portion of the drive shaft 4 sliding and coming into abutment with the inner wall of the bore 106 is provided with second rotation-preventive grooves 140 at four locations, each extending in the axial direction 5 opposite to the first rotation-preventive grooves 108. As shown in FIG. 12(a), the first rotation-preventive grooves 108 and the second rotation-preventive grooves 140 opposite to the first grooves 108 each constitute a columnar groove extending in the axial direction. In each of the columnar grooves, there are accommodated a number of steel balls 150, filling up the grooves. This arrangement permits the piece part 100 to be transferred in the axial direction 5 with a minimal resistance due to friction, and prevents rotation relative to the drive shaft 4. This system can be said to be a sort of ball spline. It is also noted that a ball spline of a different type, such as a ball spline of an endless pivotal type, can be used as a slidable rotation-preventive system.

Further, a system other than such a ball spline can also be used. For example, as shown in FIG. 12(b), a so-called key spline arrangement can also be used as a rotation-preventive system. This key spline arrangement is arranged in such a manner that the drive shaft 4 is provided with a protruding portion 140a extending in the axial direction and the piece part 100 is provided with a third rotation-preventive groove 108a disposed to accommodate the protruding portion 140a. In FIG. 12(b), the protruding portion 140a may be disposed at the side of the piece part 100 and the third rotation-preventive groove 108a may be disposed at the side of the drive shaft 4. Moreover, as shown in FIG. 12(c), a so-called key-groove type of arrangement can also be used as a rotation-preventive system, which is arranged in such a manner that the piece part 100 is provided with a fourth rotation-preventive groove 108b extending in the axial direction and the drive shaft 4 is provided with a fifth rotation-preventive groove 140b facing the fourth rotation-preventive groove 108b. These grooves constitute a groove in the form of a quadratic prism in which a key plate 170 is accommodated. A baffle portion 52 as used in the first embodiment may also be used in the third embodiment.

A first engagement face 121 of the tooth part 112 is provided with a plurality of ratchet teeth 114 engageable with the ratchet pieces 102. Each of the ratchet teeth 114 is composed of a sharply sloping face 118 and a gradually sloping face 116 with respect to the first engagement face 121, which are formed alternately and periodically along the peripheral direction of the tooth part.

Figure 11:
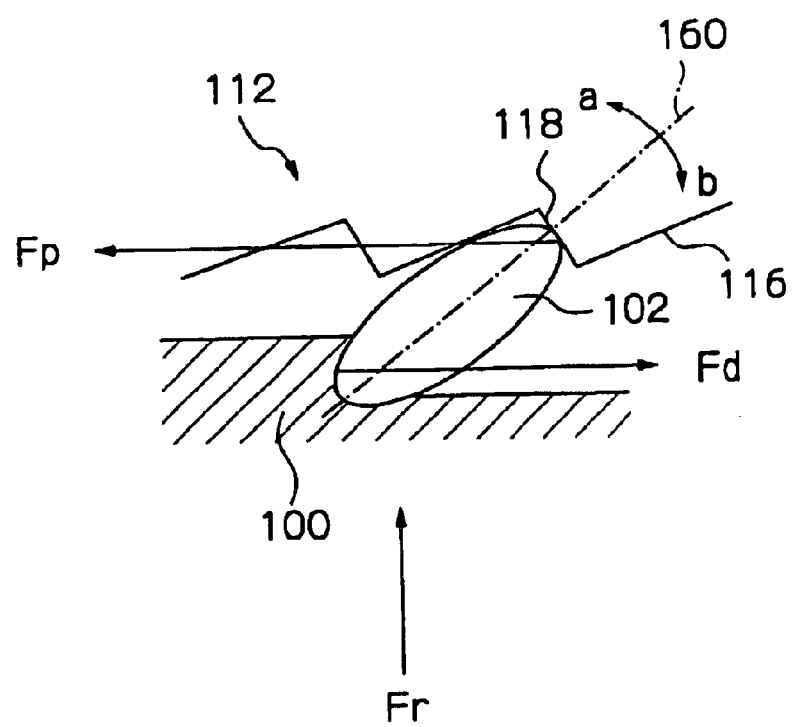
FIG. 11 is a view showing an engaged state between the tooth and the piece of a ratchet gear.

The tooth part 112 is arranged in such a manner that the ratchet pieces 102 are engaged with the ratchet teeth 114, as shown in FIG. 11, so that the first engagement face 121 is axially held on the drive shaft 4 so as to face the second engagement face 110 of the piece part 100. At this time, the drive shaft 4 is can be inserted through the bore 120 formed at the central portion of the tooth part 112 through a collar 111 and the end portion 142 of the drive shaft 4 is fixed through a washer 122, as shown in FIG. 9. Further, the tooth part 112 is connected to the supporting member 130 so as to be rotatable with respect to the sprocket 2 and the drive shaft 4. This arrangement provides a ratchet gear connecting the drive shaft 4 to the sprocket 2, and which can transmit only the rotation of the drive shaft 4 in the direction of running the bicycle forward to the sprocket 2.

Preferably, an offset spring 136 may be interposed between the sloping stopper face 144 of the drive shaft 4 and the rear face 101 of the piece part 100. The offset spring 136 is deviated in the axial direction so as to create a clearance between the steel balls 152 installed in the rear face 101 and the disc spring 124 when the pedaled force is lower than a predetermined value, e.g., when it is effectively close to zero.

Now, the actions of the third embodiment of the present invention will be described hereinafter.

As the rider presses the pedals 8R and 8L down to give a pedaled force and rotate the drive shaft 4 in the direction of running the bicycle forward, the resulting rotation force is transmitted to the piece part 100 held axially on the drive shaft 4 in a non-rotatable manner. At this time, as shown in FIG. 11, a force Fd corresponding to the pedaled force is applied to the ratchet piece 102 from the piece part 100, so that the top end portion thereof is allowed to come into abutment with the sharply sloping face 118 of the ratchet tooth 114 of the tooth part 112 in order to transmit the resulting force to the ratchet tooth. Because the ratchet tooth part 112 is connected to the sprocket 2, the top end portion of the ratchet piece 102 receives a force Fp from the sharply sloping face 118 due to the load for driving. If the ratchet piece 102 receives the forces Fp and Fd in the opposite directions from both of the end portions thereof, it is caused to arise in the direction a. As the ratchet piece 102 arises in the direction a, the piece part 100 is transferred inwardly in the axial direction and presses down on the disc spring 124 interposed between the piece part 100 and the supporting member 130. On the other hand, an elastic force Fr acts on the disc spring 124 in resistance to the force pressing down on the disc spring 124. The elastic force Fr can be balanced within a short time with the force reflecting the pedaled force transferred to the piece part 100 in the axial direction. Therefore, physical parameters such as the stress deformation of the disc spring 124, a clearance between the piece part 100 and the tooth part 112, the angle of the ratchet piece 102 with respect to the second engagement face 110, the position of the piece part 100 with respect to the bicycle body frame, and the pressure on disc spring 124, etc. can be used as physical measurements reflecting the pedaling force. The pedaled torque can, accordingly, be predicted by detecting at least one of the above physical parameters.

In this third embodiment, the stress deformation of the disc spring 124 is to be detected as an example of the physical measurement. The controller 14 is subjected to an addition operation (including an averaging operation) of signals from at least two strain gauges 126 disposed on the disc spring 124. By averaging the amounts of stress deformation at plural locations in the manner described above, a larger variation in output can be set even for the same pedaled torque, and noise components can be equalized, so that the S/N ratio can be improved to further increase the accuracy of predicting the torque. This effect can become more significant as the number of strain gauges is increased.

Further, if the pedaling force is lower than the predetermined value, the offset spring 136 provides a clearance between the rear face 101 of the piece part 100 and the disc spring 124, so that the frequency of impacts of the steel balls 152 on the disc spring 124 can be lessened. This can reduce the noise component of signals from the strain gauges to improve the detection of torque and the stability of the power-assisting control.

It is to be noted that the power-assisting control in the third embodiment of the present invention is substantially the same as that in the first and second embodiments.

The third embodiment can offer pronounced advantages and merits as will be summarized below.

(1) The ratchet gear and the torque detection mechanism system can be implemented by one mechanism system, so that the number of parts can be reduced. As a consequence, the bicycle can be rendered more compact in size and lighter in weight as well as being manufactured at lower cost than conventional ones.

(2) The disc spring with a unit for receiving a load imposed upon pedals and a load (torque) detection sensor integrated therein is used at the portion at which the pedaling torque is to be detected. Therefore, the two functions can be implemented by one unit, achieving a further compactness and lightness of structure and further reducing costs of manufacturing, in addition to the effects as described above.

(3) The present invention can achieve a compact, light-weight and simple structure of the torque detection mechanism system at a very high level as has been described in (1) and (2) above. Therefore, the possibility of mounting the torque detection mechanism system on a conventional bicycle can also be advanced.

(4) The loss in transmitting a load imposed upon pedals can be reduced as compared with a conventional mechanism system for the reasons described in (1) and (2) above, so that a feeling of assisting can be implemented with a high responsiveness to control.

(5) Ineffective movement of the pedals can be lessened (up to the time when the sensor senses) for the reasons described in (1) and (2) above, as compared with a conventional mechanism system (using a coiled spring). Therefore, the feeling upon pedaling the power-assisted bicycle according to the present invention can be as if pedaling a conventional bicycle, where there is a feeling of resistance upon pedaling for the conventional mechanism system.

Although the present invention has been described by way of each of the embodiments, it is to be understood that the present invention is interpreted as not being limited in any respect to those embodiments, and encompasses any modifications and variations without departing from the scope and spirit of the invention.

For instance, in each of the embodiments of the present invention, the electric motor is described as an example of a means for providing the assisting torque. It is to be understood, as a matter of course, that the means for providing the assisting torque is not limited to the electric motor and may include any chosen power means such as a gasoline engine or the like.

Further, in each of the embodiments of the present invention, it is to be understood that the way of mounting either one of the piece and the tooth of the ratchet gear on the sprocket and the other one of them on the drive shaft can be modified in any chosen and appropriate manner. For example, in the case of the third embodiment, the piece part 100 may be mounted at the sprocket side and the tooth part 112 may be mounted on the drive shaft 4 so as to be slidable yet non-rotatable, thereby permitting the tooth part 112 to compress the disc spring 124.

Although three ratchet pieces are taken as an example in the first and third embodiments, the number of the ratchet pieces may be two or four or more. It is also to be noted that the numbers of the grooves and the protruding portions as the rotation-preventive system, as shown in FIGS. 12(*a*)–12(*c*), are not limited to those described above.

It is further to be noted that the structuring elements can also be applied to the other embodiments without departing from the scope and spirit of the invention, even if they have been described in one or more embodiments yet not in the other embodiments. For example, the rotation-preventive system as shown in FIGS. 12(*a*)–12(*c*) can also be applied equally to the first and second embodiments. Further, the one-way clutch system as described by way of the second embodiment can also be applied to the ratchet gear in the first and third embodiments. Moreover, a plurality of the strain gauges in the second embodiment can also be disposed in the same manner as in the third embodiment, and the output signals can be subjected to an averaging operation.

The elastic member disposed in resistance to the deformation of the ratchet gear can also be modified and varied in any chosen and appropriate manner in terms of its kind and shape. An elastic member made of a rubbery material can also be used, in addition to the disc spring and the coil spring.

In each embodiment of the present invention, the physical force to be detected may be freely and appropriately selected as long as it is based on the deformation of the ratchet gear as illustrated in the third embodiment. For example, a piezoelectric sensor for detecting a variation in forcing-out pressure on the basis of the axial displacement of the ratchet tooth part may also be used in the first embodiment. Moreover, it is possible to mount a strain gauge on the ratchet piece and compute the pedaling torque on the basis of the amount of stress deformation of the ratchet piece. Furthermore, a piezoelectric sensor may be disposed at an inner bottom portion of the supporting member in the third embodiment. The angle of rotation of the ratchet piece may also be detected with an encoder disposed on the rotary shaft thereof. In addition, there may be disposed a position sensor for detecting the position of the piece part relative to the tooth part.

Moreover, although the strain gauge is taken as an example of the means of detecting the stress deformation, the means is not limited to the strain gauge as long as the physical amount associated with the stress deformation can be detected.

What is claimed is:

1. A power-assisted bicycle operable to provide an assisting power in accordance with a pedaling power acting on a drive shaft, comprising:
    a ratchet gear for transmitting a one-way rotation of said drive shaft to a sprocket, said ratchet gear including:
    a tooth part having a plurality of ratchet teeth; and
    a piece part having a plurality of ratchet pieces arranged such that said ratchet pieces engage said ratchet teeth during the one-way rotation and disengage said ratchet teeth during rotation in a direction opposite the one-way rotation, one of said tooth part and said piece part being mounted on said drive shaft via a rotation-prevention system operable to prevent rotation of said one of said tooth part and said piece part relative to said drive shaft and operable to allow sliding axial movement of said one of said tooth part and said piece part relative to said drive shaft, the other of said tooth part and said piece part being connected to said sprocket, said tooth part and said piece part being arranged such that a position of said piece part changes relative to a position of said tooth part according to a pedaling force in a direction of the one-way rotation;
    a detection system for detecting a physical parameter that varies due to the change of the position of said piece part relative to the position of said tooth part; and
    a control system for controlling the assisting power based at least in part on the physical parameter detected by said detection system.

2. The power-assisted bicycle of claim 1, wherein said ratchet gear is operable to expand and contract along an axial direction of said drive shaft based on the pedaling force.

3. The power-assisted bicycle of claim 1, wherein said ratchet gear is operable to elastically return to an original shape after the change of the position of said piece part relative to the position of said tooth part.

4. The power-assisted bicycle of claim 3, wherein said ratchet gear further includes an elastic member for resisting the change of the position of said piece part relative to the position of said tooth part and for at least assisting with the elastic return to the original shape.

5. The power-assisted bicycle of claim 4, wherein said detection system is operable to detect stress deformation of said elastic member as the physical parameter.

6. The power-assisted bicycle of claim 3, wherein said ratchet gear further includes an elastic member having a generally flat form, having a height smaller than a latitudinal width, and being arranged so a height direction of said elastic member is parallel to a direction of the change of the position of said piece part relative to the position of said tooth part.

7. The power-assisted bicycle of claim 1, wherein said detection system is operable to detect a position of said piece part relative to a body frame as the physical parameter.

8. The power-assisted bicycle of claim 1, wherein said detection system is operable to detect a clearance between said piece part and said tooth part as the physical parameter.

9. The power-assisted bicycle of claim 1, wherein said detection system is operable to detect a variation in a resistance pressure applied against the change of the position of said piece part relative to the position of said tooth part as the physical parameter.

10. The power-assisted bicycle of claim 1, wherein:
    each of said plurality of ratchet teeth has a sharply-sloping face and a gradually-sloping face arranged in an alternating manner on an engagement face of said tooth part in a peripheral direction thereof;
    each of said ratchet pieces is mounted on said piece part so as to be operable to form various angles with an engagement face of said piece part; and
    said tooth part and said piece part being arranged such that each of said ratchet pieces engages a corresponding sharply-sloping face of one of said ratchet teeth when said drive shaft is rotated in the direction of the one-way rotation, and each of said ratchet pieces abuts against a corresponding gradually-sloping face of one of said ratchet teeth when said drive shaft is rotated in a direction opposite to the direction of the one-way rotation.

11. The power-assisted bicycle of claim 1, further comprising an elastic unit, wherein said one of said tooth part and said piece part mounted on said drive shaft via a rotation-prevention system is supported such that said elastic unit is operable to abut a rear face of said one of said tooth part and said piece part opposite an engagement face of said one of said tooth part and said piece part.

12. The power-assisted bicycle of claim 11, wherein said detection system comprises a deformation detection sensor for detecting a stress deformation of said elastic unit.

13. The power-assisted bicycle of claim 11, wherein said detection system comprises a position sensor for detecting a clearance between said tooth part and said piece part.

14. The power-assisted bicycle of claim 11, wherein said elastic unit comprises a disc spring.

15. The power-assisted bicycle of claim 14, wherein said detection system comprises a plurality of strain gauges mounted on said disc spring.

16. The power-assisted bicycle of claim 15, wherein said control system is operable to determine a pedaling force for controlling the assisting power by subjecting signals from said plurality of strain gauges to at least an addition process.

17. The power-assisted bicycle of claim 15, wherein said plurality of strain gauges are mounted on a surface of said disc spring so as to be equally spaced apart.

18. The power-assisted bicycle of claim 11, further comprising an offset elastic member for biasing said one of said tooth part and said piece part mounted on said drive shaft so as to create a clearance between said rear face and said elastic unit when the pedaling force is lower than a predetermined value.

19. The power-assisted bicycle of claim 11, further comprising a supporting member mounted on said drive shaft, said elastic unit being supported within said supporting member so as to be rotatable and axially slidable.

20. The power-assisted bicycle of claim 19, wherein said supporting member is connected to said sprocket.

21. The power-assisted bicycle of claim 19, wherein said supporting member comprises a hollow cylindrical member having an inner bottom face, said hollow cylindrical member supporting said elastic unit at said inner bottom face.

22. The power-assisted bicycle of claim 11, wherein said rear face has a bearing, said bearing comprising one of a loading bearing and a sliding bearing.

23. The power-assisted bicycle of claim 22, wherein said bearing includes a plurality of steel balls inserted rotatably into a circular groove formed in said rear face.

24. The power-assisted bicycle of claim 11, wherein said rotation-prevention system comprises a ball spline.

25. The power-assisted bicycle of claim 11, wherein said one of said tooth part and said piece part mounted on said drive shaft has a bore for accommodating said drive shaft.

26. The power-assisted bicycle of claim 25, wherein said rotation-prevention system comprises a row of first grooves formed in an inner wall of said bore and extending in an axial direction, a row of second grooves formed in said drive shaft opposite said first grooves and extending in the axial direction, and steel balls accommodated between said first grooves and said second grooves.

27. The power-assisted bicycle of claim 25, wherein said rotation-prevention system comprises a row of first grooves formed in an inner wall of said bore and extending in an axial direction, a row of second grooves formed in said drive shaft opposite said first grooves and extending in the axial direction, and plates accommodated between said first grooves and said second grooves.

28. The power-assisted bicycle of claim 25, wherein said rotation-prevention system comprises a row of grooves formed in an inner wall of said bore and extending in an axial direction, and a row of protruding portions formed on said drive shaft and accommodated within said grooves.

29. The power-assisted bicycle of claim 25, wherein said rotation-prevention system comprises a row of protruding portions formed on an inner wall of said bore and extending in an axial direction, and a row of grooves formed in said drive shaft and accommodating said grooves.

30. The power-assisted bicycle of claim 11, wherein each of said ratchet pieces has a rigid body and is arranged so as to be operable to pivot about its latitudinal axis through an angle with respect to said engagement face of said piece part.

31. The power-assisted bicycle of claim 1, further comprising a sprocket drive gear engaged with said sprocket for transmitting the assisting power.

* * * * *